United States Patent [19]
Nelson

[11] 4,149,623
[45] Apr. 17, 1979

[54] OVERHEAD CONVEYOR SYSTEM

[75] Inventor: Walter T. Nelson, Frederick, Md.

[73] Assignee: American Chain & Cable Company, Inc., Bridgeport, Conn.

[21] Appl. No.: 836,660

[22] Filed: Sep. 26, 1977

Related U.S. Application Data

[63] Continuation of Ser. No. 694,351, Jun. 9, 1976, abandoned.

[51] Int. Cl.² .............................................. B65G 47/86
[52] U.S. Cl. .................................... 198/477; 198/479; 198/482; 198/653; 198/695; 294/995; 294/110 R
[58] Field of Search ............... 198/358, 469, 470, 477, 198/479, 482–484, 489, 490, 678, 680, 682, 653, 654, 694, 695; 214/1 BA, 1 BD; 294/110 R, 110 A, 99 S

[56] References Cited

U.S. PATENT DOCUMENTS

| | | | |
|---|---|---|---|
| 1,733,547 | 10/1929 | Lorenz | 198/653 |
| 3,053,400 | 9/1962 | Erickson et al. | 198/653 |
| 3,319,805 | 5/1967 | Brauer | 214/1 BD |
| 3,347,351 | 10/1967 | Mencacci et al. | 198/654 |
| 3,522,966 | 8/1970 | Wood | 294/110 R |
| 3,871,511 | 3/1975 | Wentz et al. | 198/470 |

FOREIGN PATENT DOCUMENTS 921071  2/1973  Canada ................................. 294/110 R

*Primary Examiner*—Joseph E. Valenza
*Attorney, Agent, or Firm*—Barnes, Kisselle, Raisch & Choate

[57] ABSTRACT

An overhead conveyor system comprising a conveyor, a track and a plurality of carriers movable along the track by the conveyor wherein each carrier is adapted to grip an article elevated into the path of the conveyor and to release the article. The conveyor extends along a path past a loading station and an unloading station. Loading means are provided adjacent the loading station for elevating an article into position to be gripped by the carrier and unloading means are provided at the unloading station for receiving an article released by the carrier at the unloading station. In addition, infeed and take out mechanisms are provided at the loading and unloading stations, respectively.

2 Claims, 10 Drawing Figures

OVERHEAD CONVEYOR SYSTEM

This is a continuation of application Ser. No. 694,351, filed June 9, 1976, now abandoned.

This invention relates to overhead conveyor systems.

BACKGROUND AND SUMMARY OF THE INVENTION

In the handling of articles which are to be moved from one station to another, it is desirable to provide a conveyor system to which the articles can be delivered while the conveyor is moving and from which the articles can be released while the conveyor is moving.

Accordingly, the invention is directed to an overhead conveyor system which includes a plurality of carriers, each of which is adapted to receive an article that is elevated into position at a loading station, grip the article and move it to an unloading station wherein the carrier is actuated to release the article permitting it to be delivered to the unloading station.

Further, in accordance with the invention, infeed and take away mechanisms are provided at the loading and unloading stations for delivering articles to the loading mechanism and taking away articles that are unloaded at the unloading station. Controls are provided so that articles will be loaded or unloaded only when there is a place for the articles in the loading mechanism, carrier, or unloading or take away mechanism.

DESCRIPTION

Figure 1:
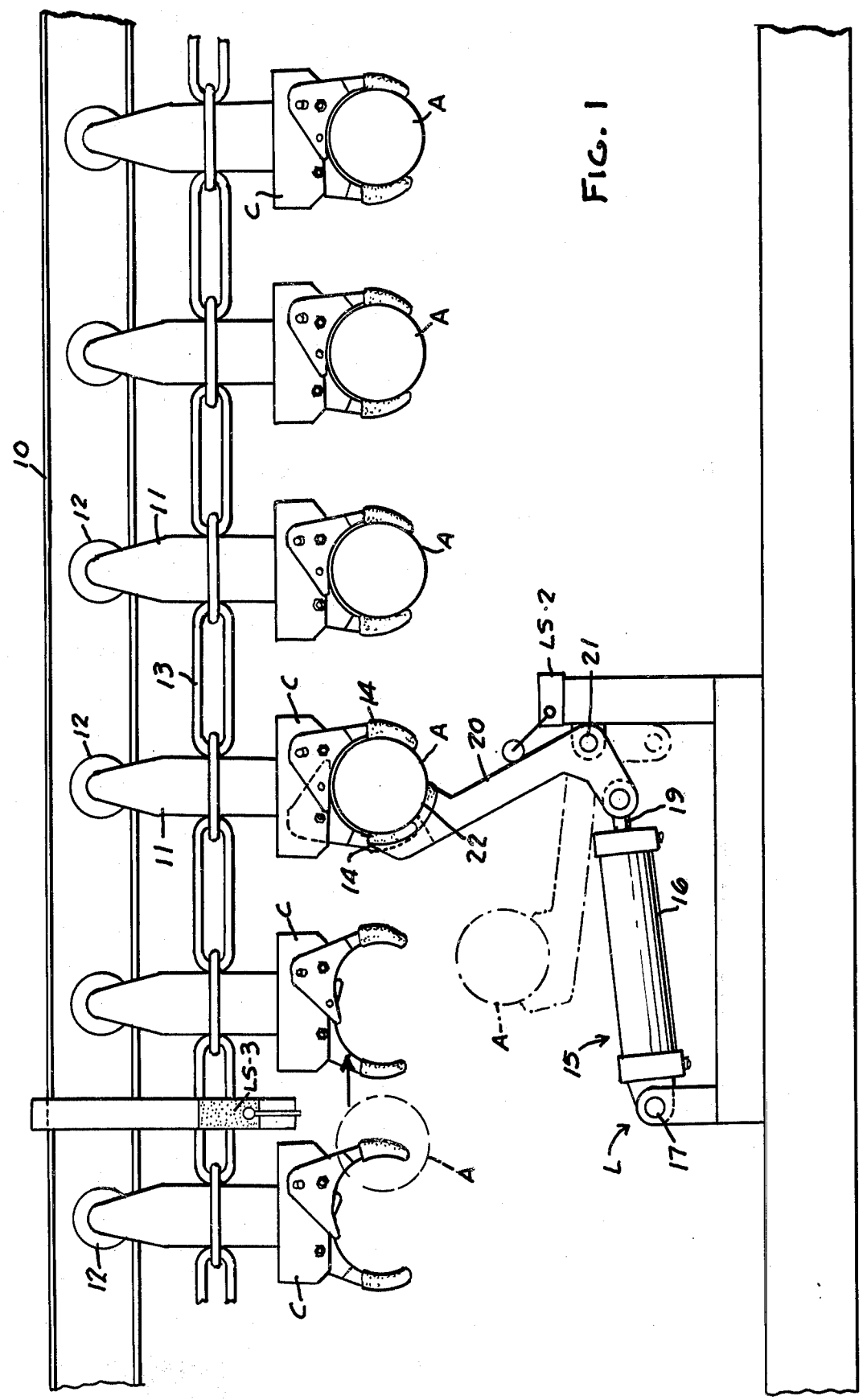
FIG. 1 is a fragmentary side elevational view of a portion of the system embodying the invention.
Figure 6:
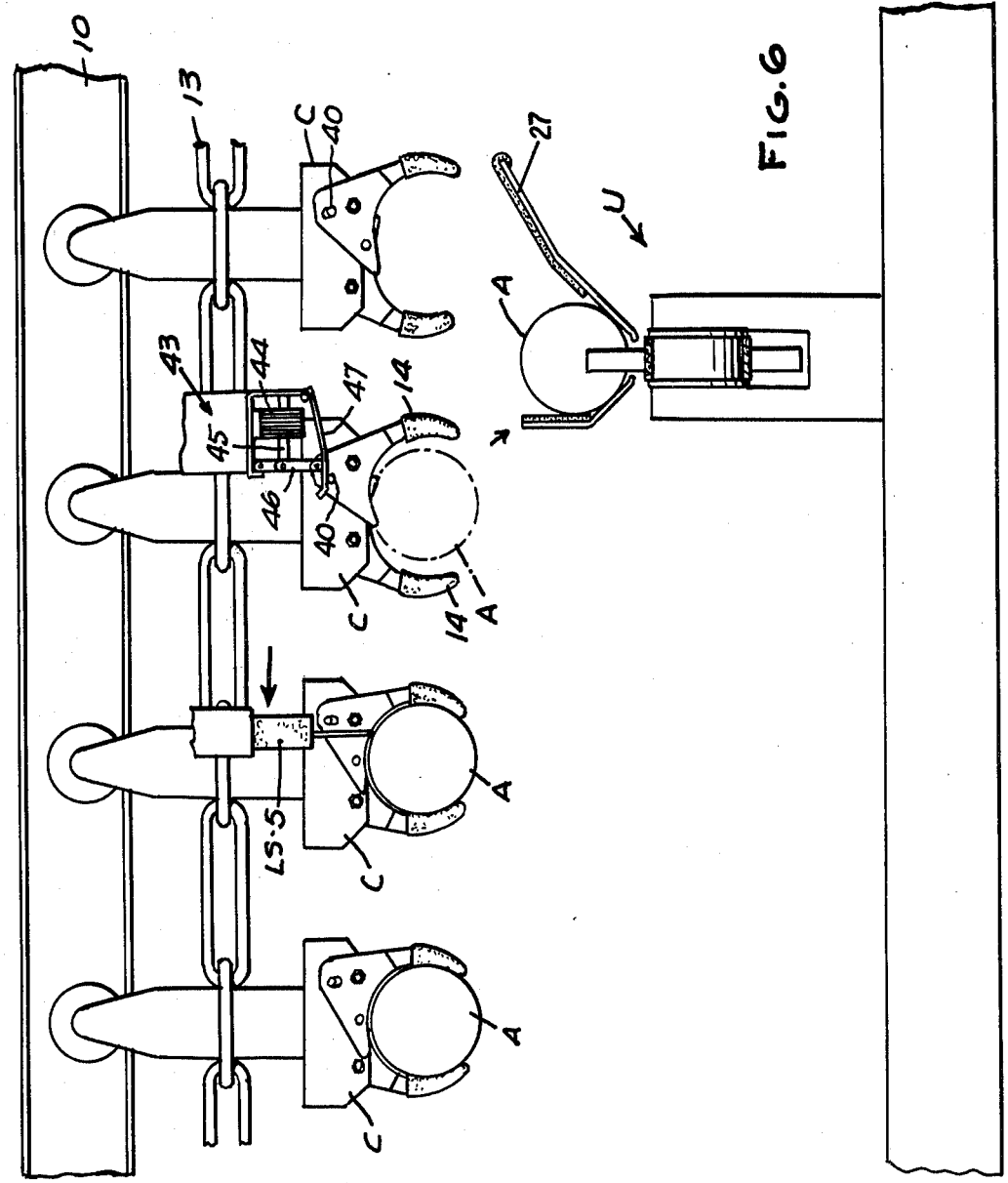
FIG. 6 is a fragmentary side elevational view of another portion of the conveyor system.

Referring to FIGS. 1 and 6, the overhead conveyor system embodying the invention comprises a track 10 from which a plurality of trolleys 11, having wheels 12 thereon engaging the track 10, are provided. The trolleys 11 support a chain conveyor 13 that is driven by drive means such as a caterpillar drive (not shown). Carriers C are mounted at longitudinally spaced points along the conveyor on hangers 11 and include arms 14 that are adapted to grip articles A. Arms 14 are pivoted about axes transverse to the longitudinal axis of the conveyor. The conveyor 13 is moved past a loading station L where the articles are loaded into the carriers 65 and past an unloading station U (FIG. 6) where the carriers are actuated to permit the articles to be unloaded, as presently described.

A loading mechanism 15 is provided at the loading station L and includes a cylinder 16 having one end thereof pivoted about a transverse axis as at 17 to a base 18 and a piston rod 19 connected to an arm 20 which, in turn, is pivoted intermediate its ends as at 21. Arm 20 includes an arcuate cradle or seat 22 that is adapted to receive an article A when the arm is in lowered position and to elevate the article to the position shown in FIG. 1 so that it can be gripped by the arms 14.

Figure 2:
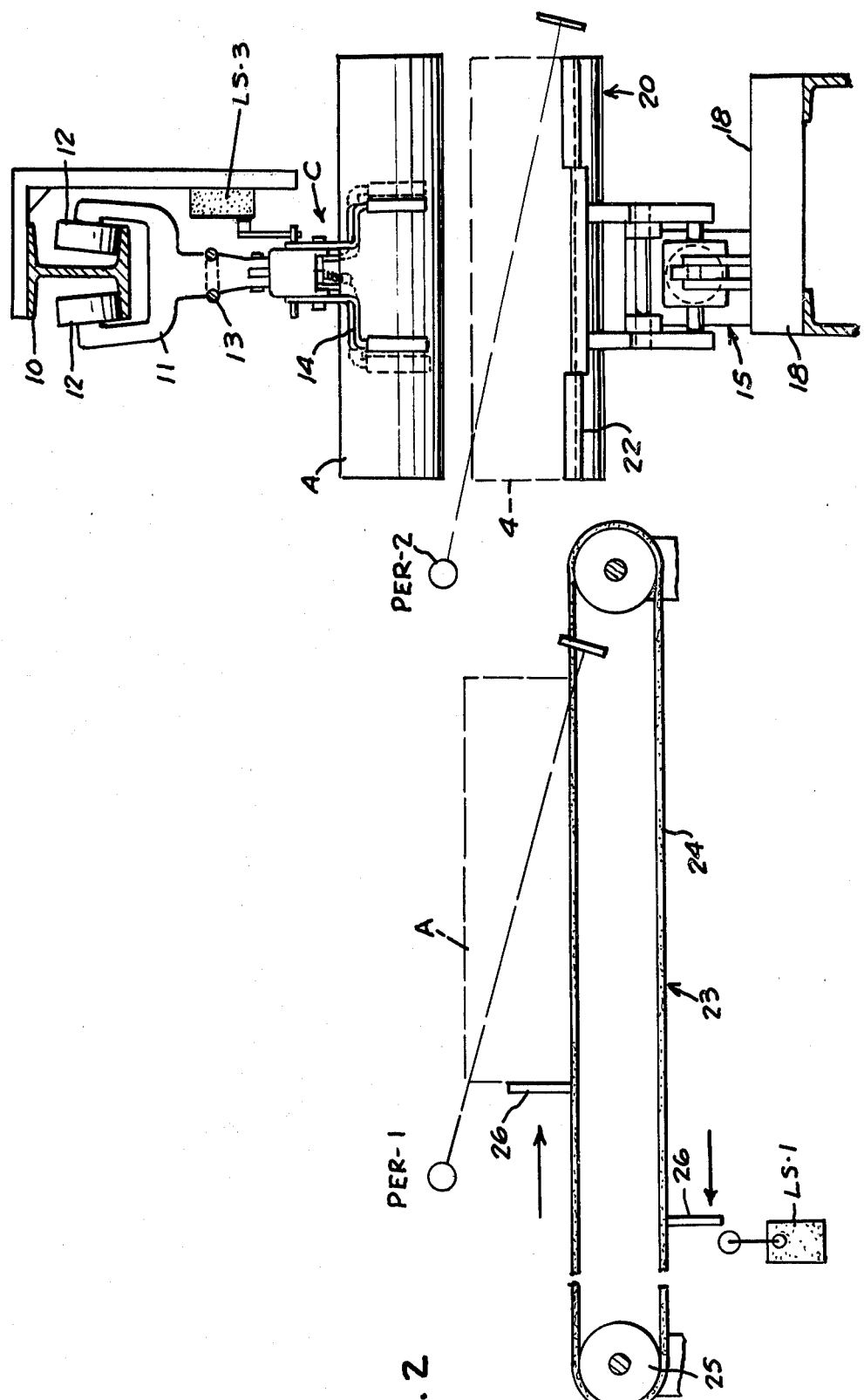
FIG. 2 is an end elevational view of a portion of the system shown in FIG. 1.

At the loading station L, a transfer apparatus 23 is provided for delivering articles to the arm 20 and comprises an endless conveyor 24 driven intermittently by a motor having an electric clutch and brake 25 connecting it to the conveyor 24 (FIG. 2). The conveyor includes pushers 26 that are adapted to engage the articles A and move them into position onto seat 22. Electric eyes or photocells PER-1 and PER-2 are provided for sensing the presence of an article on the conveyor 24 and on the arm 20.

Referring to FIG. 6, at the unloading station U, a trough 27 is provided and extends transversely for receiving the articles A released from the carriers C.

Figure 7:
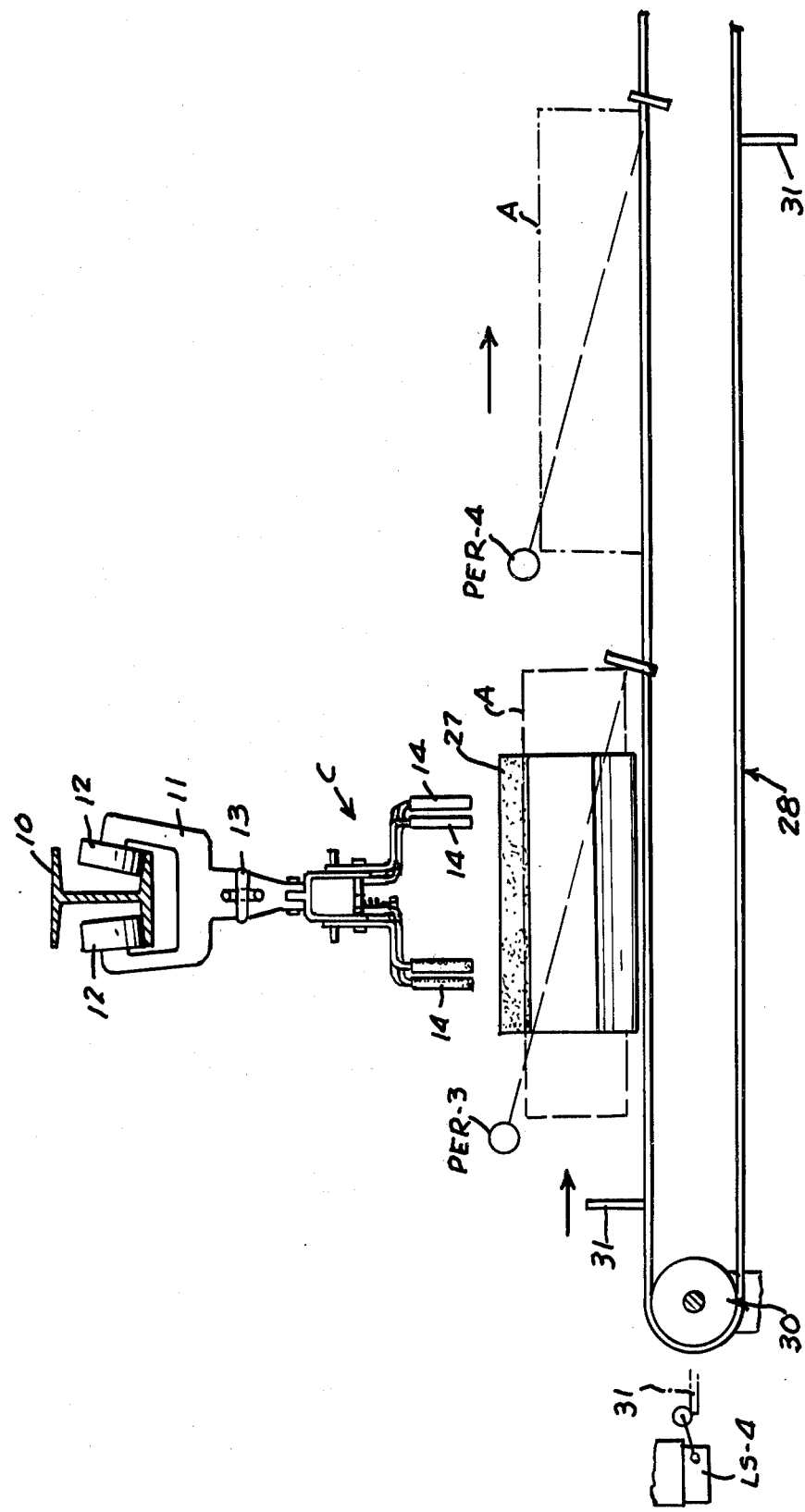
FIG. 7 is an end elevational view of the portion of the system shown in FIG. 6.

Referring to FIG. 7, a take away mechanism 28 in the form of an intermittently driven endless conveyor 29, controlled by an electric clutch and brake 30, is provided for taking articles A away from the trough 27. Conveyor 29 includes pushers 31. Electric eyes or photocells PER-3 and PER-4 are provided for sensing the presence of an article on the trough 27 and on the conveyor 29.

Figure 3:
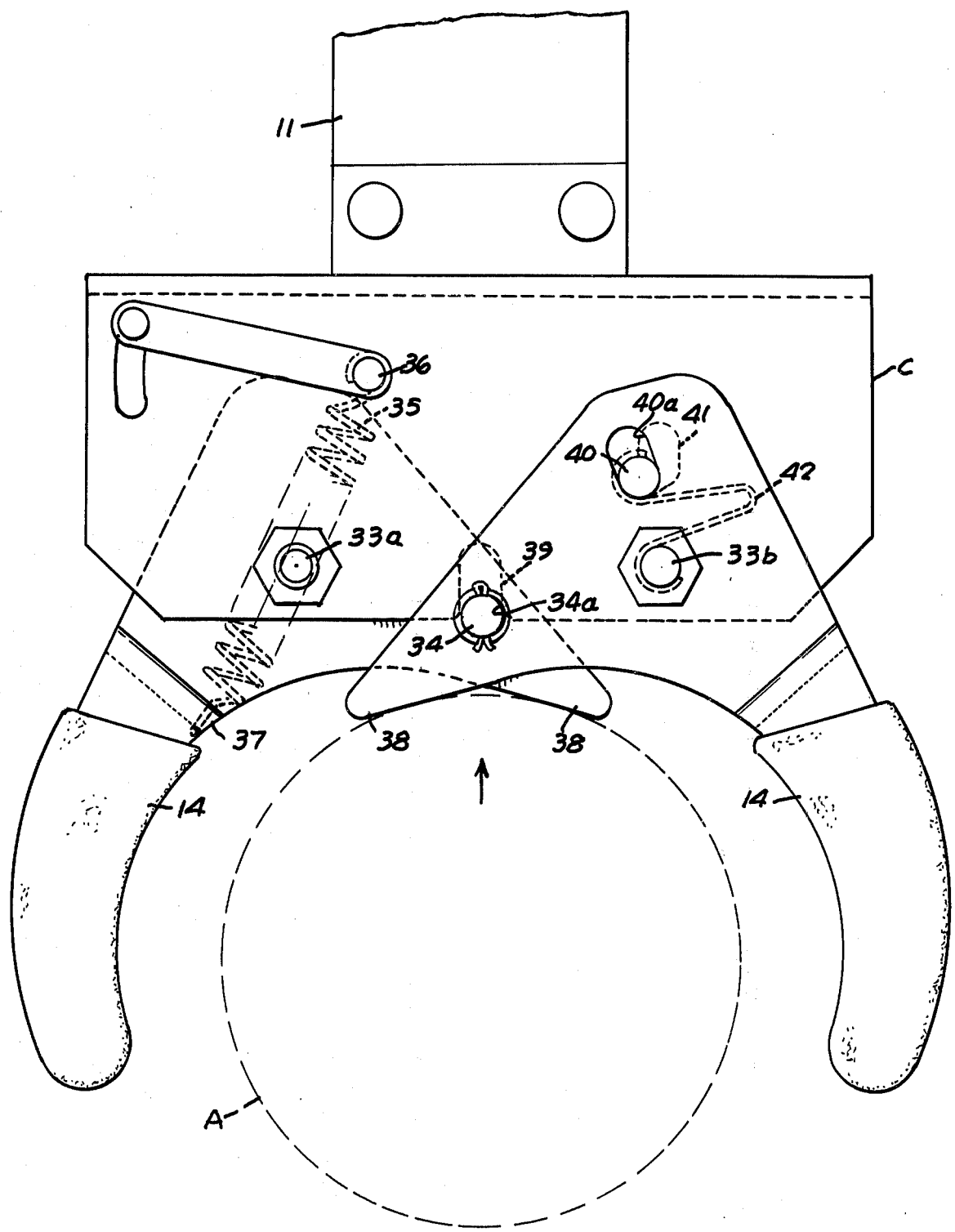
FIG. 3 is a fragmentary side elevational view on an enlarged scale of a portion of the carrier shown in FIG. 1.
Figure 4:
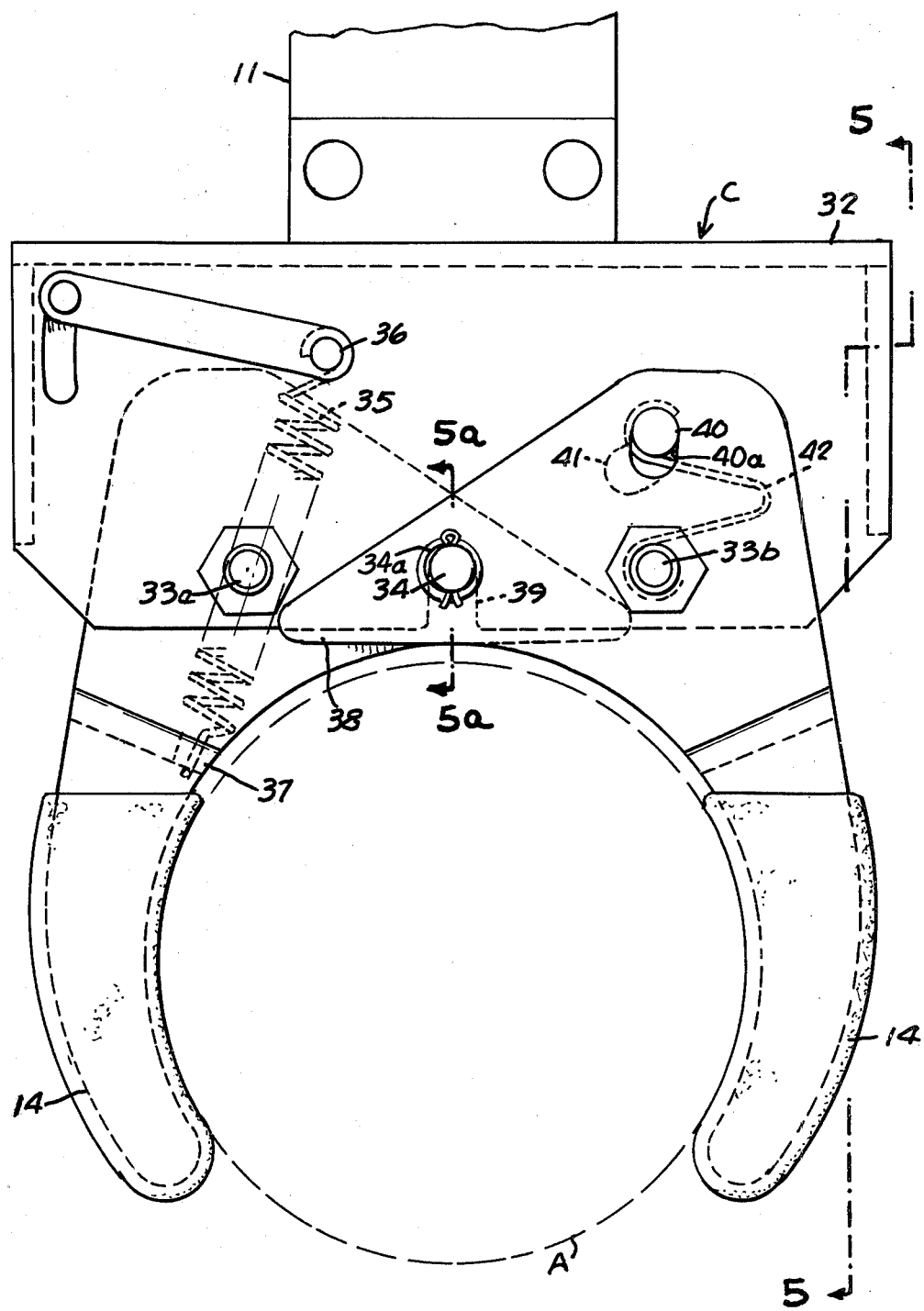
FIG. 4 is a view similar to FIG. 3 showing the parts in a different operative position.
Figures 5, 5A:
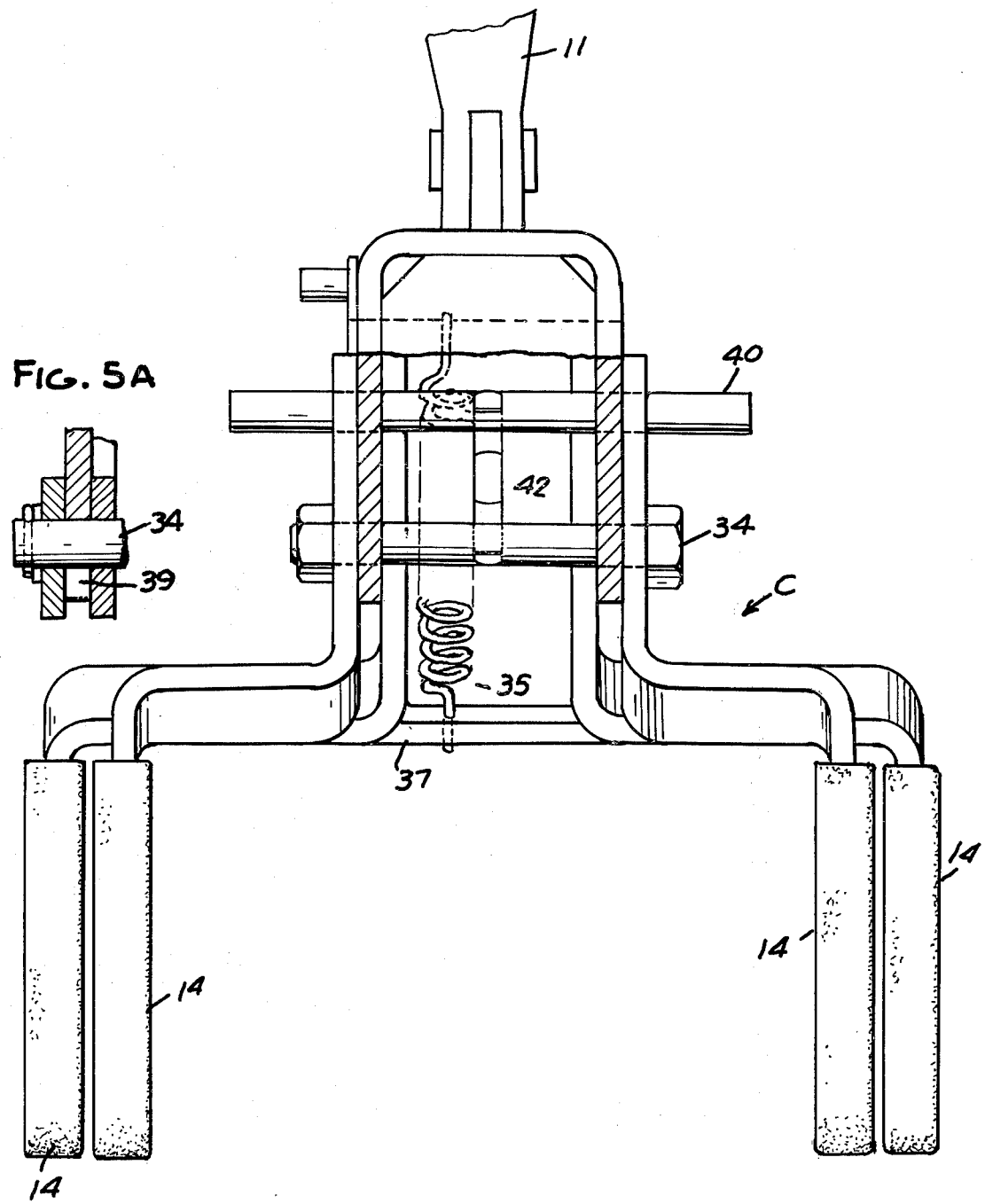
FIG. 5 is a sectional view taken along the line 5—5 in FIG. 4.
FIG. 5A is a fragmentary sectional view taken along the line 5A—5A in FIG. 4.

Referring to FIGS. 3-5, each carrier C includes a body 32 from which the arms 14 are pivoted by bolts 33a, 33b. A pin 34 extends through elongated slots 34a in the inner ends of the arms 14 and interconnects the arms. A tension spring 35 is connected at one end on a pin 36 and at the other end to one of the arms 14 as at 37 and normally holds the arms 14 open. Each arm 14 is provided with an inwardly extending portion 38 so that when an article A is moved upwardly in the direction of the arrow shown in FIG. 3, the arms 14 are pushed upwardly at 38 causing the spring 35 to move over the center of bolt 33a and thereby yieldingly urge the arms 14 toward one another so that they will grip the article A. At the same time, the pin 34 moves upwardly in a vertical open-ended slot 39 in the carrier body 32.

A latching pin 40 is provided in a slot 40a in one arm 14 and extends through a J shaped slot 41 in the body 32 that has a vertical portion and an inwardly inclined portion. A spring 42 extends between the bolt 33b and the pin 40 and tends to urge the pin 40 toward the upper end of the slot 41.

When it is desired to unlatch the arms 14, an unlatching device 43 on the track (FIG. 6) is energized to move the unlatching pin 40 downwardly and permit the weight of the article A on the arms 14 to move the arms 14 to a position wherein the spring 35 will fully open the arms permitting the article A to drop onto the unloading trough 27.

As shown in FIG. 6, the unlatching mechanism 43 comprises a solenoid 44 having a plunger 45 which actuates links 46 to move a plate 47 downwardly into the path of the pin 40 so that the pin is moved downwardly against the action of the unlatching spring permitting the pin 40 to move toward the lower end of the slot 41.

The arms 14 and trough 27 are preferably coated with a material such as plastisol to protect the articles from damage.

Figure 8:
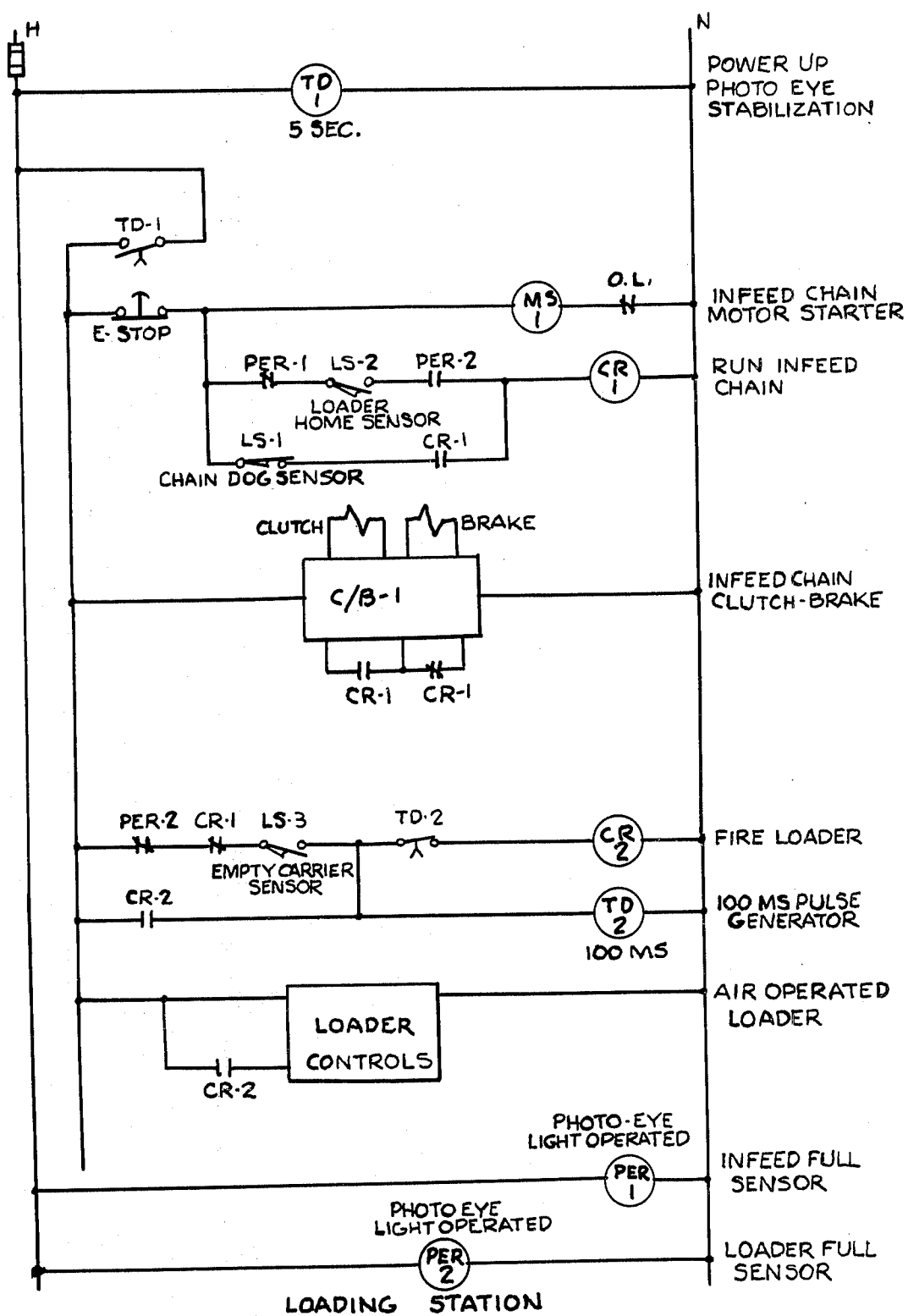
FIG. 8 is a wiring diagram of the system at the loading station.

FIG. 8 shows the electrical circuit of the system at the loading station. A time delay TD1 is provided for permitting the full energization of the photo eyes PER-1 and PER-2. Each photo eye PER-1 and PER-2 comprises a combined photocell and light emitter and a retro-reflector which normally returns the light from the light emitter to the photocell when an article is not present.

It can be seen that if PER-1 is blocked, it indicates that an article A is present on the conveyor 24. If, at the same time, PER-2 is not blocked indicating the absence of an article on the arm 20, the clutch brake C/B-1 will be actuated causing relay CR-1 to close and to start the motor to drive the infeed conveyor 24 and thereby deliver an article to an arm 20 until the switch LS-1 is actuated by pusher 26 to stop the conveyor 24. Limit switch LS-2 indicates that the arm 20 is in position to receive an article and will inhibit operation of the conveyor 24 in the event that the arm is elevated. The initiation of the movement of the arm 20 by actuation of the LOADER CONTROLS is controlled by relay CR-2 which functions only when photo electric eye PER-2 shows the presence of an article, CR-1 shows that the conveyor 24 is not operating, and limit switch LS-3 along the track shows that a carrier approaching the loading station is not loaded with an article. LOADER CONTROLS operates to cycle cylinder 16 of loader 15 when a pulse is received from relay CR-2. The duration of the pulse is controlled by time delay TD-2.

Figure 9:
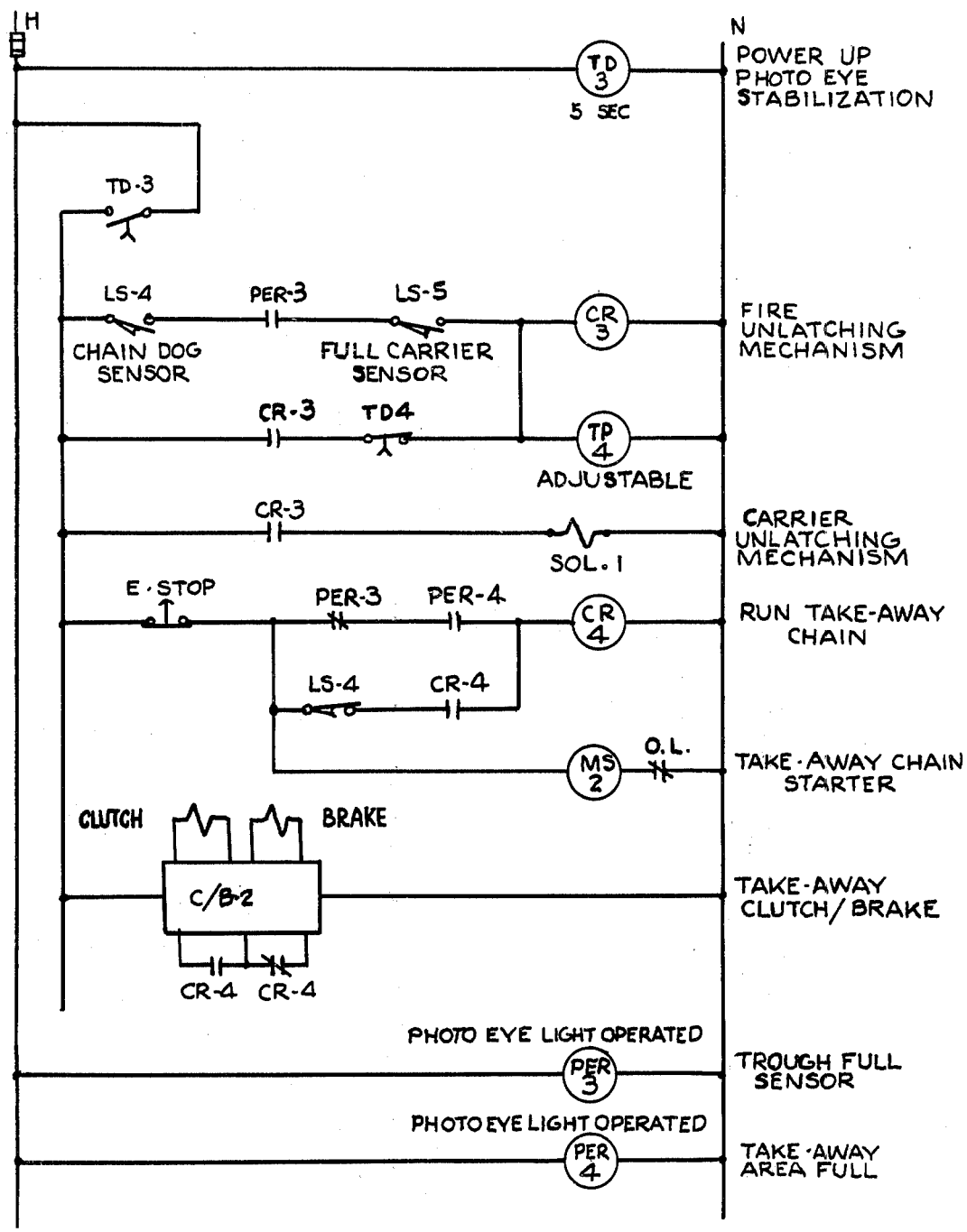
FIG. 9 is a wiring diagram of the system at the unloading station.

Similarly, FIG. 9 shows an unloading station wherein the electric eyes PER-3 and PER-4 have a time delay TD-3 associated therewith to insure full energization before the rest of the circuit can operate. The solenoid SOL.1 for unlatching the latch of the carrier is fired when limit switch LS-5 senses that an article is in the carrier, PER-3 is unblocked, and limit switch LS-4 senses that the outfeed or take away chain is stopped. Time delay TD-4 adjusts the time the solenoid SOL.1 is energized to extend deflector 47 into the path of latching pin 40. When the article is delivered to the trough, PER-3 indicates the trough is full and if PER-4 shows that the take away mechanism is empty, the conveyor is energized to move the article A from the trough and along the path of the conveyor. This is achieved by relay CR-4 that actuates the clutch brake C/B-2.

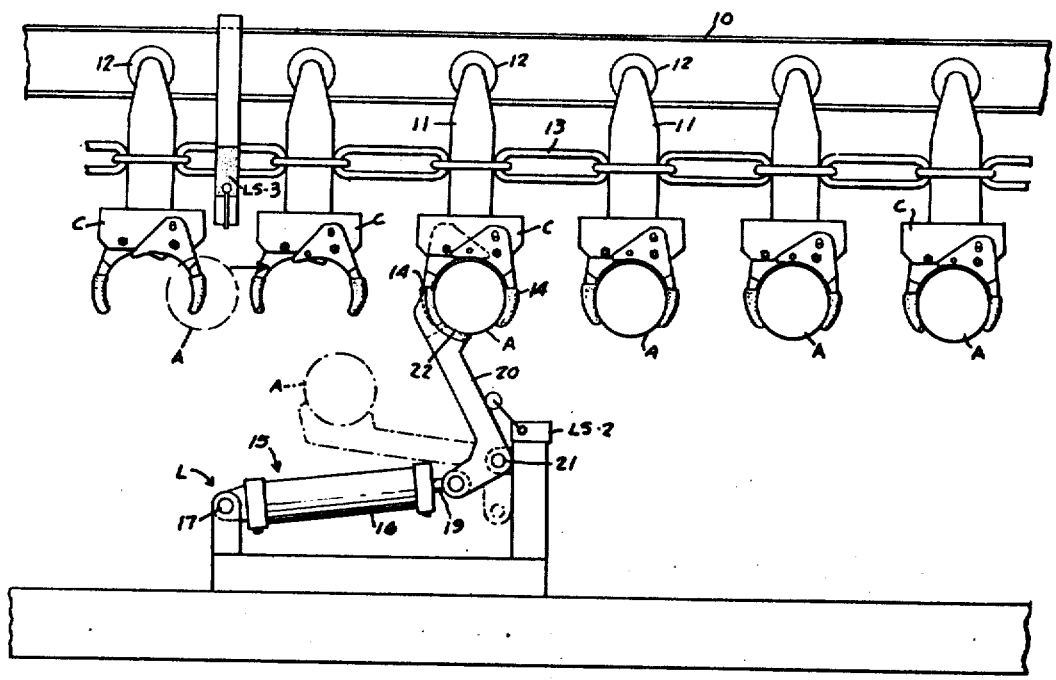

I claim:

1. In an overhead conveyor system, the combination comprising
   a conveyor,
   a track,
   a plurality of carriers movable along said track by said conveyor,
   each said carrier being adapted to grip an article delivered to the conveyor and release an article,
   each said carrier comprising a pair of arms movable about transverse axes toward and away from one another,
   spring means normally urging said arms into open position,
   said arms having portions thereof adapted to be engaged by an article moved within said arms to move said arms to a position wherein said spring means causes said arms to move to a closed gripping position,
   latch means operable solely by the movement of the arms when the article engages the arms and assisted by the action of said spring means to hold said arms in closed position,
   said track extending along a generally horizontal path past a loading station and an unloading station,
   loading means adjacent the loading station for elevating an article directly into said arms of a carrier as the carrier is moved past said loading station,
   and unloading means at the unloading station for receiving an article released by said carrier at said unloading station,
   said arms having elongated slots in the inner ends thereof,
   pin means extending through said slots and interconnecting said arms,
   said carrier having an open-ended slot in which said pin means is movable,
   said latch means comprising a latching pin,
   one of said arms having an elongated slot through which said pin extends,
   said carrier having a J shaped slot through which said latching pin extends and a spring tending to urge said latching pin toward one end of said J shaped slot.

2. In an overhead conveyor system, the combination comprising
   a conveyor,
   a track,
   a plurality of carriers movable along said track by said conveyor,
   each said carrier being adapted to grip an article delivered to the conveyor and release an article,
   each said carrier comprising a pair of arms movable about transverse axes toward and away from one another,
   spring means normally urging said arms into open position,
   said arms having portions thereof adapted to be engaged by an article moved within said arms to move said arms to a position wherein said spring means causes said arms to move to a closed gripping position,
   latch means operable by the movement of the arms when the article engages the arms and assisted by the action of said spring means to hold said arms in closed position,
   said track extending along a generally horizontal path past a loading station and an unloading station,
   loading means adjacent the loading station for elevating an article directly into said arms of a carrier as the carrier is moved past the loading station,
   unloading means at the unloading station for receiving an article released by said carrier at said unloading station,
   means for delivering an article to said loading means,
   means adjacent said unloading station for taking an article away from said unloading means,
   said arms having elongated slots in the inner ends thereof,
   pin means extending through said slots and interconnecting said arms,
   said carrier having an open-ended slot in which said pin means is movable,
   said latch means comprising a latching pin,
   one of said arms having an elongated slot through which said latching pin extends,
   said carrier having a J shaped slot through which said latching pin extends and a spring tending to urge said latching pin toward one end of said J shaped slot.

* * * * *

UNITED STATES PATENT OFFICE
CERTIFICATE OF CORRECTION

Patent No. 4,149,623  Dated  April 17, 1979

Inventor(s) Walter T. Nelson

It is certified that error appears in the above-identified patent and that said Letters Patent are hereby corrected as shown below:

The title page should be deleted to insert the attached title page therefor.

Signed and Sealed this

Twenty-eighth Day of August 1979

[SEAL]

Attest:

Attesting Officer

LUTRELLE F. PARKER
Acting Commissioner of Patents and Trademarks

United States Patent [19]

Nelson

[11] 4,149,623
[45] Apr. 17, 1979

[54] OVERHEAD CONVEYOR SYSTEM

[75] Inventor: Walter T. Nelson, Frederick, Md.

[73] Assignee: American Chain & Cable Company, Inc., Bridgeport, Conn.

[21] Appl. No.: 836,660

[22] Filed: Sep. 26, 1977

Related U.S. Application Data

[63] Continuation of Ser. No. 694,351, Jun. 9, 1976, abandoned.

[51] Int. Cl.² ............................................. B65G 47/86
[52] U.S. Cl. .................................... 198/477; 198/479; 198/482; 198/653; 198/695; 294/995; 294/110 R
[58] Field of Search ............... 198/358, 469, 470, 477, 198/479, 482–484, 489, 490, 678, 680, 682, 653, 654, 694, 695; 214/1 BA, 1 BD; 294/110 R, 110 A, 99 S

[56] References Cited

U.S. PATENT DOCUMENTS

| 1,733,547 | 10/1929 | Lorenz | 198/653 |
| 3,053,400 | 9/1962 | Erickson et al. | 198/653 |
| 3,319,805 | 5/1967 | Brauer | 214/1 BD |
| 3,347,351 | 10/1967 | Mencacci et al. | 198/654 |
| 3,522,966 | 8/1970 | Wood | 294/110 R |
| 3,871,511 | 3/1975 | Wentz et al. | 198/470 |

FOREIGN PATENT DOCUMENTS 921071  2/1973  Canada ............................. 294/110 R Primary Examiner—Joseph E. Valenza
Attorney, Agent, or Firm—Barnes, Kisselle, Raisch & Choate

[57] ABSTRACT

An overhead conveyor system comprising a conveyor, a track and a plurality of carriers movable along the track by the conveyor wherein each carrier is adapted to grip an article elevated into the path of the conveyor and to release the article. The conveyor extends along a path past a loading station and an unloading station. Loading means are provided adjacent the loading station for elevating an article into position to be gripped by the carrier and unloading means are provided at the unloading station for receiving an article released by the carrier at the unloading station. In addition, infeed and take out mechanisms are provided at the loading and unloading stations, respectively.

2 Claims, 10 Drawing Figures